(12) United States Patent
Ito

(10) Patent No.: US 7,442,730 B2
(45) Date of Patent: *Oct. 28, 2008

(54) COMPOSITION HAVING DISPERSE SYSTEM, AND PROCESS FOR PRODUCING COLORED ORGANIC SOLID PARTICLE

(75) Inventor: Hisayoshi Ito, Himeji (JP)

(73) Assignee: Daicel Chemical Industries, Ltd., Sakai-shi (JP)

( * ) Notice: Subject to any disclaimer, the term of this patent is extended or adjusted under 35 U.S.C. 154(b) by 26 days.

This patent is subject to a terminal disclaimer.

(21) Appl. No.: 10/580,605

(22) PCT Filed: Nov. 10, 2004

(86) PCT No.: PCT/JP2004/016656

§ 371 (c)(1),
(2), (4) Date: May 25, 2006

(87) PCT Pub. No.: WO2005/052060

PCT Pub. Date: Jun. 9, 2005

(65) Prior Publication Data

US 2007/0125266 A1 Jun. 7, 2007

(30) Foreign Application Priority Data

Nov. 28, 2003 (JP) .............................. 2003-400820

(51) Int. Cl.
*C08L 3/00* (2006.01)
*C08L 89/00* (2006.01)
*C08L 1/00* (2006.01)
*C08L 5/00* (2006.01)
*D21H 19/54* (2006.01)
*C09D 101/00* (2006.01)
*C09D 103/00* (2006.01)
*C09D 105/00* (2006.01)
*C09J 101/00* (2006.01)
*C09J 103/00* (2006.01)
*C09J 105/00* (2006.01)
*C08K 5/00* (2006.01)

(52) U.S. Cl. .................. 524/47; 106/162.1; 106/162.2; 106/217.7; 106/498; 106/501.1

(58) Field of Classification Search .................. 524/47; 106/162.1, 162.2, 217.7, 498, 501.1
See application file for complete search history.

(56) References Cited

U.S. PATENT DOCUMENTS 4,822,535 A * 4/1989 Ekman et al. ................. 264/4.3
5,096,492 A * 3/1992 Fuisz ....................... 106/217.7

(Continued)

FOREIGN PATENT DOCUMENTS

EP 0213303 A2 3/1987

(Continued)

*Primary Examiner*—Mark Eashoo
*Assistant Examiner*—Liam J Heincer
(74) *Attorney, Agent, or Firm*—Birch, Stewart, Kolasch & Birch, LLP

(57) ABSTRACT

A colored particle (e.g., a spherical particle) comprising an organic solid component (e.g., a polymer component) and a coloring agent (e.g., an oil-soluble dye, and an organic or inorganic pigment) is produced by eluting a water-soluble auxiliary component comprising at least an oligosaccharide from a composition having a disperse system, in which a particulate dispersed phase comprising the organic solid component and the coloring agent is dispersed in a matrix comprising the auxiliary component. The weight ratio of the polymer component relative to the auxiliary component may be about 55/45 to 1/99. The proportion of the coloring agent may be about 0.001 to 100 parts by weight relative to 100 parts by weight of the organic solid component. Such a process ensures conveniently and industrially advantageous production of a colored particle (e.g., a colored polymer particle) corresponding to the dispersed phase independently of affinity between the dispersed phase and the matrix.

15 Claims, 1 Drawing Sheet

U.S. PATENT DOCUMENTS

| | | | |
|---|---|---|---|
| 5,104,914 A * | 4/1992 | Elton et al. | 524/22 |
| 5,596,056 A * | 1/1997 | Nambu et al. | 526/207 |
| 5,945,245 A * | 8/1999 | Mychajlowskij et al. | 430/137.14 |
| 5,961,710 A * | 10/1999 | Linde et al. | 106/437 |
| 5,961,711 A * | 10/1999 | Saikatsu et al. | 106/498 |
| 5,964,938 A * | 10/1999 | Balliello | 106/493 |
| 5,985,019 A * | 11/1999 | McCrae et al. | 106/413 |
| 6,211,347 B1 * | 4/2001 | Sieber et al. | 534/801 |
| 6,267,812 B1 * | 7/2001 | Lefer et al. | 106/487 |
| 6,294,013 B1 * | 9/2001 | Ortlano et al. | 106/499 |
| 6,299,676 B1 * | 10/2001 | Saikatsu et al. | 106/31.77 |
| 6,419,830 B2 * | 7/2002 | Strom et al. | 210/645 |
| 6,468,341 B2 * | 10/2002 | Wada et al. | 106/413 |
| 6,471,766 B2 * | 10/2002 | Ohki et al. | 106/498 |
| 6,518,334 B1 * | 2/2003 | Calhoun et al. | 524/47 |
| 6,548,170 B2 * | 4/2003 | Perrier et al. | 428/402 |
| 6,548,579 B2 * | 4/2003 | Reski et al. | 524/47 |
| 6,641,656 B2 * | 11/2003 | Yu et al. | 106/493 |
| 6,669,771 B2 * | 12/2003 | Tokiwa et al. | 106/162.7 |
| 6,736,892 B2 * | 5/2004 | Godwin et al. | 106/499 |
| 6,753,377 B1 * | 6/2004 | Niinikoski et al. | 524/734 |
| 6,780,903 B2 * | 8/2004 | Peltonen et al. | 524/47 |
| 6,784,231 B2 * | 8/2004 | Shimada et al. | 524/93 |
| 6,786,965 B2 * | 9/2004 | Perry et al. | 106/491 |
| 6,800,127 B2 * | 10/2004 | Bäbler | 106/493 |
| 6,800,675 B1 * | 10/2004 | Pfalz et al. | 524/47 |
| 6,825,252 B2 * | 11/2004 | Helbling et al. | 524/47 |
| 6,936,097 B2 * | 8/2005 | Shakhnovich | 106/493 |
| 6,939,536 B2 * | 9/2005 | Chen et al. | 424/70.1 |
| 6,962,950 B1 * | 11/2005 | Bastioli et al. | 524/47 |
| 7,192,477 B2 * | 3/2007 | Nakanishi et al. | 106/412 |
| 7,217,488 B2 * | 5/2007 | Mikuriya et al. | 430/110.2 |
| 2001/0021733 A1 * | 9/2001 | Peltonen et al. | 524/47 |
| 2001/0026898 A1 * | 10/2001 | Tomita | 430/108.4 |
| 2003/0049559 A1 * | 3/2003 | Shigemori et al. | 430/137.18 |
| 2003/0078320 A1 * | 4/2003 | Yatake | 523/160 |
| 2003/0157421 A1 * | 8/2003 | Matsushima et al. | 430/124 |
| 2003/0188664 A1 * | 10/2003 | Anantharaman et al. | 106/493 |
| 2004/0127601 A1 * | 7/2004 | Sano et al. | 523/160 |
| 2004/0181009 A1 * | 9/2004 | Shelton et al. | 525/54.3 |
| 2004/0266911 A1 * | 12/2004 | Aida et al. | 523/160 |
| 2005/0176878 A1 * | 8/2005 | Ettl et al. | 524/571 |
| 2005/0208005 A1 * | 9/2005 | Giroud | 424/70.1 |
| 2006/0039936 A1 * | 2/2006 | Fares et al. | 424/401 |
| 2006/0239946 A1 * | 10/2006 | Samain et al. | 424/63 |
| 2006/0286168 A1 * | 12/2006 | Koike et al. | 424/470 |
| 2007/0037900 A1 * | 2/2007 | Harada et al. | 523/160 |
| 2007/0104951 A1 * | 5/2007 | Ito | 428/402.2 |

FOREIGN PATENT DOCUMENTS

| | | | |
|---|---|---|---|
| EP | 555980 A1 * | 8/1993 | |
| EP | 0924255 A2 | 6/1999 | |
| EP | 1 247 840 A1 | 10/2002 | |
| JP | 9-48876 A | 2/1997 | |
| JP | 10-176065 A | 6/1998 | |
| JP | 2002-275272 A | 9/2002 | |
| WO | WO-01/42367 A1 | 6/2001 | |

* cited by examiner

COMPOSITION HAVING DISPERSE SYSTEM, AND PROCESS FOR PRODUCING COLORED ORGANIC SOLID PARTICLE

TECHNICAL FIELD

The present invention relates to a colored organic solid particle (e.g., a polymer particle) useful for a cosmetic, an image recording material (such as an ink or a colored particle) used for an ink jet printer or other means, a paint and varnish such as a powdered paint, and a coloring agent for a print ink, and a process for producing the particle, as well as a composition having a disperse system, which is useful for producing the organic solid particle.

BACKGROUND ART

Heretofore, as a process for obtaining a colored fine particle of a thermoplastic resin, a mechanical pulverization (or crushing) method has been utilized, which comprises, for example, coarsely crushing a colored polymer composition obtained by melt-kneading a coloring component and a polymer by using a crushing machine or other means, then pulverizing the crushed matter finely by using a jet mill or other means, and classifying the resultant by an air classifier or other means.

In such a method, however, manufacturing machines are expensive, and additionally, thus obtained particle is irregular in shape and widely varies in particle size. In order to make the polymer particle size uniform, the obtained particle should be classified. However, unusable polymer particles in size are produced in large quantities by classification, and are unfavorable from an economical viewpoint. Further, spherical fine particles are preferred from the viewpoint of blocking among particles, dispersibility, flowability or others, however, it is impossible to obtain spherical particles by mechanical pulverization (or crushing) methods.

Japanese Patent Application Laid-Open No. 275272/2002 (JP-2002-275272A, Patent Document 1) discloses a process for producing a colored fine particle polymer comprising melting a colored polymer having a coloring matter uniformly dispersed or dissolved in a thermoplastic resin, making the molten colored polymer a droplet-like fine particle in an insoluble medium having no solubility to the colored polymer, and cooling the droplet-like fine particle for solidification. In this process, however, the steps are complicated and a high temperature of the insoluble medium is required for dissolving the thermoplastic resin in the making step of the droplet-like particle. Therefore, the kind of the insoluble medium is limited to an organic solvent having a high boiling point. Moreover, in order to avoid fusing between the droplets in the cooling step, it is necessary to cool down to about 0° C., and it is impossible to stably obtain particles having a uniform particle size.

Japanese Patent Application Laid-Open No. 176065/1998 (JP-10-176065A, Patent Document 2) discloses a process for obtaining a spherical fine particle of a thermoplastic resin (a), which comprises melt-kneading the thermoplastic resin (a) to be powdered with other one or more of thermoplastic resin(s) (b) to give a polymer composition comprising the resin (a) constituting the dispersed phase and the resin (b) constituting the continuous phase, and washing the polymer composition with a solvent under conditions incapable of dissolving the resin (a) and capable of dissolving the resin (b). The document also mentions a process for adding various additives (including a pigment or a dye) to the resin (a). In this process, however, since the additive (such as a pigment or a dye) is also distributed to the resin (b) constituting the continuous phase, the additive such as a pigment cannot be effectively utilized as an agent for imparting a function to a resin and has an economical disadvantage. Moreover, in this process, it is necessary that the resin to be powdered is a resin excellent in solvent resistance and that the dispersed phase and the continuous phase are immiscible with each other. Further, it is necessary to appropriately select the combination of the resin constituting the continuous phase and the solvent depending on the kind of the resin of the dispersed phase. Therefore, not only the combination of these resins but also that of the resins and the solvent are limited to a specific one. Further, in the process of cooling the disperse composition, since resins immiscible with each other tend to induce a large phase separation, a fine particle having a given shape cannot be obtained due to reaggregation of once produced dispersed phase. Furthermore, the resin constituting the continuous phase is to be recovered in the end, or to be discarded in a dissolved state, as it is not included in the resin fine particle as a final product. However, recovery of the resin in the solution not only is very difficult but also is a caused factor of increase in the production cost of the polymer particle. Moreover, in the case of discarding the resin solution directly as a waste fluid, adverse effects on the environment cannot be ignored.

Patent Document 1: JP-2002-275272A (Claim 1)
Patent Document 2: JP-10-176065A (Claim 1, Paragraph No. [0042])

DISCLOSURE OF THE INVENTION

Problems to be Solved by the Invention

It is therefore an object of the present invention to provide a composition having a disperse system, which is capable of producing a colored particle corresponding to a dispersed phase (a colored organic solid particle such as a colored polymer particle) industrially with advantage by a convenient method independent of (i) miscibility or immiscibility between the dispersed phase and a matrix, and (ii) solvent resistance; a process for producing a colored particle from the composition; and the colored particle.

It is another object of the present invention to provide a composition having a disperse system, which is capable of coloring a dispersed phase efficiently and utilizing a coloring agent with raising efficiency thereof, a process for producing a colored particle from the composition, and the colored particle.

It is still another object of the present invention to provide a composition having a disperse system, which is capable of making a particle size of a colored particle smaller and narrowing the particle size distribution, and making the colored particle spherical; a process for producing a colored particle from the composition; and the colored particle.

It is a still further object of the present invention to provide a composition having a disperse system, which is capable of reducing the burden on the environment due to a waste fluid or other factors, and a process for producing the colored particle.

Means to Solve the Problems

The inventor of the present invention made intensive studies to achieve the above objects and finally found that, in the case where a composition having a disperse system is formed from a meltable organic solid component in combination with a water-soluble auxiliary component comprising at least an oligosaccharide, selection of a coloring agent having a high affinity to an organic solid ensures to selectively distribute the coloring agent to the dispersed phase of the composition, and that, in the case of eluting or extracting the water-soluble auxiliary component being the matrix of the composition with an aqueous medium, the solution obtained by the elution hardly contains the coloring agent. The present invention was accomplished based on the above finding.

That is, the composition having a disperse system (or the dispersion composition) of the present invention comprises a particulate dispersed phase comprising a meltable organic solid component (e.g., a polymer (or resin) component) (A) and a coloring agent (B), and a matrix comprising a water-soluble auxiliary component (C) comprising at least an oligosaccharide (C1), wherein the dispersed phase is dispersed in the matrix. The coloring agent (B) may comprise at least one member selected from the group consisting of a water-insoluble dye (or a dye sparingly soluble in water) (e.g., an oil-soluble dye) and an organic or an inorganic pigment. The proportion of the coloring agent (B) may be about 0.001 to 200 parts by weight (e.g., about 0.001 to 100 parts by weight) relative to 100 parts by weight of the organic solid component (A).

The average particle size of the dispersed phase may be about 0.1 to 100 μm, and the average particle size of the coloring agent (B) may be not more than 50% of the average particle size of the dispersed phase. The dispersed phase may be a spherical dispersed phase having a coefficient of variation of an average particle size of not more than 60 and a length ratio of a major axis relative to a minor axis of 1.5/1 to 1/1. The organic solid component (A) may comprise a thermoplastic resin having a weight-average molecular weight of not more than about 500,000.

The oligosaccharide (C1) may comprise at least a tetrasaccharide. The oligosaccharide (C1) may comprise at least one member selected from the group consisting of a starch sugar, a galactooligosaccharide, a coupling sugar, a fructooligosaccharide, a xylooligosaccharide, a soybean oligosaccharide, a chitin oligosaccharide and a chitosan oligosaccharide. The viscosity of a 50% by weight aqueous solution of the oligosaccharide (C1) may be not lower than 1 Pa·s upon the viscosity being measured at a temperature of 25° C. by a B-type viscometer.

The auxiliary component (C) may comprise the oligosaccharide (C1) and a water-soluble plasticizing component (C2) for plasticizing the oligosaccharide (C1). The oligosaccharide (C1) may show a melting point or softening point at a temperature higher than a heat distortion temperature of the organic solid component (e.g., a polymer component) (A), or is decomposed at a temperature higher than the heat distortion temperature, and the melting point or softening point of the plasticizing component (C2) may be not higher than the heat distortion temperature of the organic solid component (e.g., a polymer component) (A). The plasticizing component (C2) may comprise at least one member selected from the group consisting of a saccharide and a sugar alcohol (e.g., erythritol, pentaerythritol, arabitol, ribitol, xylitol, sorbitol, dulcitol and mannitol). The ratio (weight ratio) of the oligosaccharide (C1) relative to the plasticizing component (C2) may be about 99/1 to 50/50.

In the dispersion composition, the ratio (weight ratio) of the organic solid component (A) relative to the auxiliary component (C) may be about 55/45 to 1/99.

The present invention also includes a process for producing a particle comprising an organic solid component (A) and a coloring agent (B) comprising eluting an auxiliary component (C) from the dispersion composition, and a particle obtainable by the process. The particle may be a spherical particle having an average particle size of 0.1 to 100 μm, a coefficient of variation of the average particle size of not more than 60, and a length ratio of a major axis relative to a minor axis of 1.5/1 to 1/1.

Incidentally, throughout this specification, the dispersion composition may be a composition (e.g., a polymer composition) for forming a disperse system containing an organic solid component (e.g., a polymer component), a coloring agent and an auxiliary component, and is sometimes used synonymously with the term "polymer composition" accordingly. Moreover, in the specification, a colored organic solid component is sometimes simply referred to as an organic solid component; a colored polymer component is sometimes simply referred to as a polymer component; and a water-soluble auxiliary component is sometimes simply referred to as an auxiliary component. Incidentally, the term "spherical" shape is not limited to a finely spherical shape, and includes a shape having a length ratio of a major axis relative to a minor axis of about 1.5/1 to 1/1 (preferably about 1.2/1 to 1/1, and more preferably about 1.1/1 to 1/1).

Incidentally, throughout this description, the meaning of the term "organic solid component" includes not only a carbon-containing organic compound but also a silicon-containing compound (e.g., a silicone) as far as the compounds are in a solid form.

EFFECTS OF THE INVENTION

According to the present invention, since a dispersed phase comprising an organic solid component (e.g., a polymer component) and a coloring agent is dispersed in the form of a particle in a matrix comprising a specific water-soluble auxiliary component, independent of (i) affinity (miscibility or immiscibility) between the dispersed phase and the matrix, and (ii) solvent resistance, a colored particle (e.g., a colored polymer particle) corresponding to the dispersed phase can be produced industrially with advantage by a convenient method. Moreover, use of a coloring agent having a high affinity to the organic solid component as the coloring agent ensures to color the dispersed phase efficiently and to utilize the coloring agent efficiently with enhancing efficiency thereof. Since the coloring agent can be selectively distributed to the dispersed phase and the auxiliary component comprises a component derived from a natural product, the burden on the environment due to a waste fluid can be reduced. Further, the present invention ensures to reduce the particle size of the colored particle, narrow the particle size distribution, and make the particle spherical.

DETAILED DESCRIPTION OF THE INVENTION

[Dispersion Composition]

Figure 1:
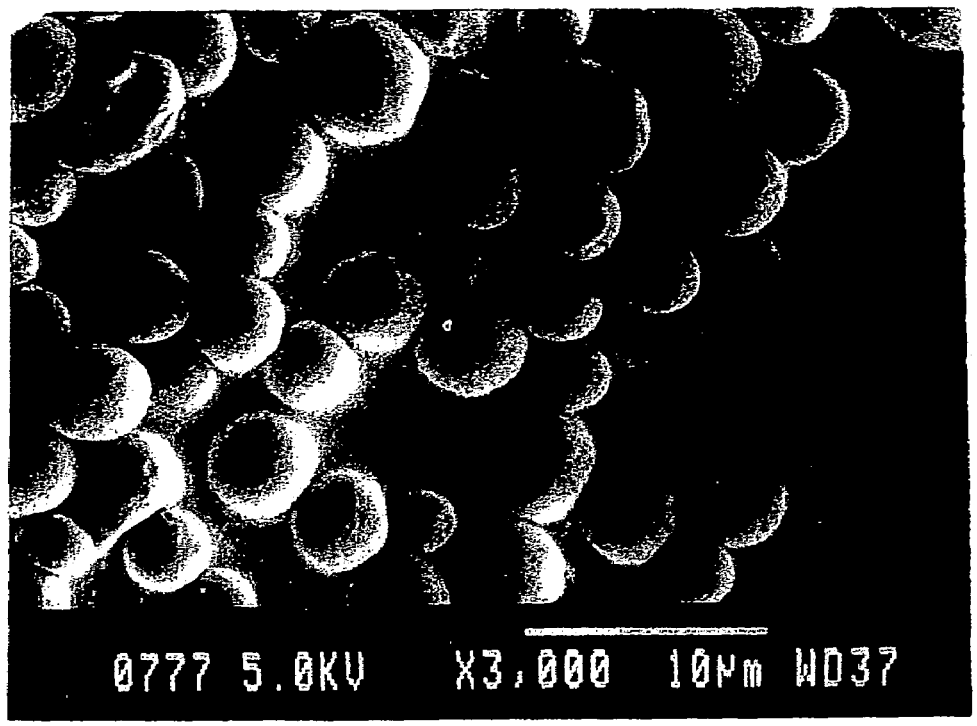
FIG. 1 is a transmission electron micrograph of a colored polymer particle obtained in Example 2.

In the dispersion composition of the present invention, a particulate dispersed phase comprising a meltable organic solid component (A) and a coloring agent (B) is dispersed in a matrix comprising a water-soluble auxiliary component (C) containing at least an oligosaccharide (C1).

(A) Meltable Organic Solid Component

As the meltable (or thermoplastic) organic solid component (A), a component (water-insoluble component) immiscible with or hydrophobic relative to the water-soluble auxiliary agent (or component) (C) may be usually employed.

The organic solid component (A) is usually a solid at a room temperature (about 15 to 25° C.), and may be a low molecular weight compound or a high molecular weight compound (or a polymer or resin). The melting point of the organic solid component (A) having a low molecular weight may be about 40 to 280° C. (preferably about 50 to 270° C., and more preferably about 70 to 260° C.), or a compound having a relatively high melting point (about 100 to 260° C.) may be used as the organic solid component (A). The organic solid components (A) may be used singly or in combination.

The organic solid component (A) having a low molecular weight may include, for example, a wax or lipid, a stabilizer (e.g., an antioxidant such as a hindered phenol-series, a hindered amine-series or a phosphorus-series antioxidant, and an ultraviolet ray absorbing agent or light stabilizer such as a benzophenone-series or a salicylic acid-series ultraviolet ray absorbing agent or a hindered amine-series light stabilizer), an antistatic agent, a flame retardant, a lubricant, a nucleation agent, a vulcanization accelerator, an antiaging agent, and a vulcanizing agent. Examples of the wax or lipid may include an aliphatic hydrocarbon-series wax (e.g., a polyolefinic wax such as a polyethylene wax or a polypropylene wax, a paraffin-series wax, and a microcrystalline wax), a plant- or animal-derived wax (e.g., a carnauba wax, a yellow bees wax, a shellac wax, and a montan wax), a higher fatty acid ester (e.g., a glycerin fatty acid ester, a diglycerin fatty acid ester, and a polyglycerin fatty acid ester), a fatty acid amide (e.g., stearic acid amide, and erucic acid amide), an alkylenebis fatty acid amide (e.g., methylenebisstearic acid amide, ethylenebisstearic acid amide, and ethylenebishydroxystearic acid amide), a metal salt of a fatty acid (e.g., a polyvalent metal salt of a higher fatty acid, such as barium laurate, zinc laurate, calcium stearate, zinc stearate or magnesium stearate). Incidentally, the wax or lipid may be also used as a lubricant. These components may be used singly or in combination.

According to the present invention, even in such an organic solid component having a low molecular weight, a particle (in particular a fine spherical particle) may be obtained by using in combination with the water-soluble auxiliary agent (C). Therefore, the present invention can improve handleability of such an organic solid component (A) having a low molecular weight.

As the organic solid component (A), a high molecular weight compound (polymer or resin) is often used. Examples of the polymer may include a thermoplastic resin [for example, a condensation-series thermoplastic resin such as a polyester-series polymer (e.g., an aromatic polyester-series polymer, and an aliphatic polyester-series polymer), a polyamide-series polymer, a polyurethane-series polymer, a poly(thio)ether series polymer (e.g., a polyacetal-series polymer, a polyphenylene ether-series polymer, a polysulfide-series polymer, and a polyetherketone-series polymer), a polycarbonate-series polymer, a polysulfone-series polymer, or a polyimide-series polymer; a vinyl polymerization-type (or series) thermoplastic resin such as a polyolefinic polymer, a (meth)acrylic polymer, a styrenic polymer, or a vinyl-series polymer (e.g., a halogen-containing polymer, a vinyl ester-series polymer, and a vinyl alcohol-series polymer); a natural product-derived polymer such as a cellulose derivative; and a thermoplastic silicone], and a thermosetting resin [for example, an epoxy polymer, an unsaturated polyester polymer, a diallyl phthalate polymer, and a silicone (e.g., a silicone rubber, and a silicone varnish)]. These resins or polymers may be used singly or in combination. As the polymer component (A), a thermoplastic resin or a water-insoluble polymer (e.g., a water-insoluble thermoplastic resin) is usually employed.

(Thermoplastic Resin)
(1) Polyester-Series Polymer

The polyester-series polymer (or resin) may include, for example, a polyester including a copolyester obtained by a polycondensation of a dicarboxylic acid component and a diol component; a polyester including a copolyester obtained by a polycondensation of a hydroxycarboxylic acid; and a polyester including a copolyester obtained by a ring opening polymerization of a lactone. These polyester-series polymers may be used singly or in combination.

The dicarboxylic acid component may include, for example, an aromatic dicarboxylic acid [e.g., an aromatic dicarboxylic acid having about 8 to 20 carbon atoms, such as terephthalic acid, isophthalic acid, phthalic acid; an alkyl-substituted phthalic acid such as methylterephthalic acid or methylisophthalic acid; a naphthalenedicarboxylic acid (e.g., 2,6-naphthalenedicarboxylic acid, 2,7-naphthalenedicarboxylic acid, and 1,5-naphthalenedicarboxylic acid); a diphenyldicarboxylic acid such as 4,4'-diphenyldicarboxylic acid or 3,4'-diphenyldicarboxylic acid; a diphenoxyethanedicarboxylic acid such as 4,4'-diphenoxyethanedicarboxylic acid; a diphenyl ether-dicarboxylic acid such as diphenyl ether-4, 4'-dicarboxylic acid; a diphenylalkanedicarboxylic acid such as diphenylmethanedicarboxylic acid or diphenylethanedicarboxylic acid; or a diphenylketonedicarboxylic acid], an aliphatic dicarboxylic acid (e.g., an aliphatic dicarboxylic acid having about 2 to 40 carbon atoms, such as oxalic acid, succinic acid, adipic acid, azelaic acid, sebacic acid, dodecanedioic acid, hexadecanedicarboxylic acid, or dimeric acid), and an alicyclic dicarboxylic acid (e.g., an alicyclic dicarboxylic acid having about 8 to 12 carbon atoms, such as cyclohexanedicarboxylic acid, hexahydrophthalic acid, hexahydroisophthalic acid, hexahydroterephthalic acid, or himic acid). These dicarboxylic acid components may be used singly or in combination.

Incidentally, the dicarboxylic acid component may also include an ester-formable derivative, e.g., a lower alkyl ester such as a dimethyl ester, an acid anhydride, and an acid halide such as an acid chloride.

Examples of the diol component may include an aliphatic $C_{2-12}$diol (e.g., ethylene glycol, propylene glycol, 1,4-butanediol, 1,3-butanediol, neopentyl glycol, hexanediol, and a (poly)$C_{2-4}$alkylene glycol (e.g., diethylene glycol and dipropylene glycol)); and an alicyclic $C_{6-12}$diol (e.g., cyclohexanediol, and cyclohexanedimethanol); an aromatic $C_{6-20}$diol (e.g., resorcinol, hydroquinone, naphthalenediol; a bisphenol compound such as bisphenol A, F, or AD; and an adduct of a bisphenol compound with an alkylene oxide). These diol components may be used singly or in combination.

The hydroxycarboxylic acid may include, for example, an aliphatic $C_{2-6}$hydroxycarboxylic acid such as glycolic acid, lactic acid, hydroxypropionic acid, hydroxybutyric acid, glyceric acid, or tartronic acid; and an aromatic hydroxycarboxylic acid such as hydroxybenzoic acid, or hydroxynaphthoic acid. These hydroxycarboxylic acids may be used singly or in combination.

Examples of the lactone may include a $C_{3-12}$lactone such as propiolactone, butyrolactone, valerolactone, or caprolactone. These lactones may be used singly or in combination. Among these lactones, a $C_{4-10}$lactone, in particular a caprolactone (e.g., ϵ-caprolactone), is preferred.

The polyester-series polymer may include an aromatic polyester-series polymer, an aliphatic polyester-series polymer, and others.

Examples of the aromatic polyester-series polymer may include a polyester including a copolyester obtained by polycondensation of the aromatic dicarboxylic acid (preferably, an aromatic dicarboxylic acid having about 8 to 20 carbon atoms, such as terephthalic acid, isophthalic acid, phthalic acid or a naphthalenedicarboxylic acid) and the aliphatic diol (preferably, an aliphatic $C_{2-12}$diol such as ethylene glycol, propylene glycol, 1,4-butanediol or 1,3-butanediol) or the alicyclic diol (preferably, e.g., an alicyclic $C_{6-20}$diol such as cyclohexanedimethanol), and preferably include a polyester including a copolyester having an alkylene arylate unit such as an alkylene terephthalate or an alkylene naphthalate as a main unit (e.g., not less than 50% by weight). The copolymerizable component may include a poly$C_{2-4}$alkylene glycol having a repeating oxyalkylene unit of about 2 to 4 [e.g., a glycol compound containing a poly(oxy-$C_{2-4}$alkylene) unit such as diethylene glycol], or an aliphatic dicarboxylic acid having about 6 to 12 carbon atoms (e.g., adipic acid, pimelic acid, suberic acid, azelaic acid, and sebacic acid).

More specifically, as the aromatic polyester-series polymer, there may be exemplified a polyalkylene terephthalate [e.g., a polycycloalkanedi$C_{1-4}$alkylene terephthalate such as a poly(1,4-cyclohexanedimethylene terephthalate) (PCT); and a poly$C_{2-4}$alkylene terephthalate such as a polyethylene terephthalate (PET) or a polybutyleneterephthalate (PBT)], a poly$C_{2-4}$alkylene naphthalate corresponding to the polyalkylene terephthalate (e.g., a polyethylene naphthalate), a polyethylene terephthalate copolyester containing an ethylene terephthalate unit as a main unit, and a polybutylene terephthalate copolyester containing a butylene terephthalate unit as a main unit. The aromatic polyester-series polymer may be a liquid crystalline polyester.

Examples of the aliphatic polyester-series polymer may include a polyester including a copolyester obtained by a polycondensation of the aliphatic dicarboxylic acid component (e.g., an aliphatic dicarboxylic acid having about 2 to 6 carbon atoms, such as oxalic acid, succinic acid or adipic acid, and preferably an aliphatic dicarboxylic acid having about 2 to 4 carbon atoms, such as oxalic acid or succinic acid) and the aliphatic diol component (e.g., an aliphatic $C_{2-6}$diol (a $C_{2-6}$alkanediol) such as ethylene glycol, propylene glycol, 1,4-butanediol, 1,3-butanediol, neopentyl glycol or hexanediol, and preferably an aliphatic $C_{2-4}$diol (a $C_{2-4}$alkanediol) such as ethylene glycol, 1,4-butanediol or neopentyl glycol), a polyester including a copolyester of the aliphatic hydroxycarboxylic acid (e.g., an aliphatic $C_{2-6}$hydroxycarboxylic acid such as glycolic acid, lactic acid, hydroxypropionic acid or hydroxybutyric acid, and preferably an aliphatic $C_{2-4}$hydroxycarboxylic acid such as glycolic acid or lactic acid), and a homopolylactone or copolylactone obtained by a ring opening polymerization of the lactone (preferably, a $C_{4-10}$lactone such as caprolactone) with an initiator (a bifunctional or trifunctional initiator, e.g., an active hydrogen-containing compound such as an alcohol compound). The copolymerizable component may include a poly$C_{2-4}$alkylene glycol having a repeating oxyalkylene unit of about 2 to 4 [e.g., a glycol compound containing a poly(oxy-$C_{2-4}$alkylene) unit such as diethylene glycol], or an aliphatic dicarboxylic acid having about 6 to 12 carbon atoms (e.g., adipic acid, pimelic acid, suberic acid, azelaic acid, and sebacic acid).

More specifically, the aliphatic polyester-series polymer may include, for example, a polyester-series polymer obtained by a polycondensation of a dicarboxylic acid component and a diol component (for example, a poly$C_{2-6}$alkylene oxalate such as a polyethylene oxalate, a polybutylene oxalate or a polyneopentylene oxalate; a poly$C_{2-6}$alkylene succinate such as a polyethylene succinate, a polybutylene succinate or a polyneopentylene succinate; and a poly$C_{2-6}$alkylene adipate such as a polyethylene adipate, a polybutylene adipate or a polyneopentylene adipate), a polyhydroxycarboxylic acid-series polymer (e.g., a polyglycolic acid, and a polylactic acid), and a polylactone-series polymer [e.g., a poly$C_{3-12}$lactone-series polymer such as a polycaprolactone (e.g., "PCLH7", "PCLH4" and "PCLH1" manufactured by Daicel Chemical Industries, Ltd.)]. The concrete examples of the copolyester include a copolyester containing two kinds of dicarboxylic acid components (e.g., a poly$C_{2-4}$alkylene succinate-adipate copolymer such as a polyethylene succinate-adipate copolymer or a polybutylene succinate-adipate copolymer), and a copolyester obtained from a dicarboxylic acid component, a diol component and a lactone (e.g., a polycaprolactone-polybutylene succinate copolymer (such as a butanediol-succinic acid-caprolactone ternary copolymer)).

The polyester-series polymer used in the present invention may be a polyester-series polymer containing a urethane bond (for example, an aliphatic polyester-series polymer containing a urethane bond). The polyester-series polymer containing a urethane bond preferably includes a polymer obtained from the above polyester-series polymer (e.g., a polyester diol having a low molecular weight) to have a high molecular weight with a diisocyanate compound (e.g., an aliphatic diisocyanate).

The diisocyanate compound may include an aromatic diisocyanate (e.g., a phenylene diisocyanate, a tolylene diisocyanate, and diphenylmethane-4,4'-diisocyanate), an araliphatic diisocyanate compound (e.g., a xylylene diisocyanate), an alicyclic diisocyanate compound (e.g., isophorone diisocyanate), an aliphatic diisocyanate compound (e.g., trimethylene diisocyanate, tetramethylene diisocyanate, pentamethylene diisocyanate, hexamethylene diisocyanate, lysine diisocyanatemethyl ester, and trimethylhexamethylene diisocyanate), and others. These diisocyanate compounds may be used singly or in combination. Among these diisocyanate compounds, the aliphatic diisocyanate compound, e.g., hexamethylene diisocyanate, may be used.

Examples of the polyester-series polymer containing a urethane bond (e.g., an aliphatic polyester-series polymer) may include "BIONOLLE #1000" series, "BIONOLLE #3000" series and "BIONOLLE #6000" series manufactured by Showa Highpolymer Co., Ltd.

(2) Polyamide-Series Polymer

The polyamide-series polymer (or resin) may include, for example, an aliphatic polyamide-series polymer, an alicyclic polyamide-series polymer, and an aromatic polyamide-series polymer, and the aliphatic polyamide-series polymer is usually employed. These polyamide-series polymers may be used singly or in combination.

Examples of the aliphatic polyamide-series polymer may include a condensate (or condensed product) of an aliphatic diamine component (a $C_{4-10}$alkylenediamine such as tetramethylenediamine or hexamethylenediamine) and an aliphatic dicarboxylic acid component (e.g., a $C_{4-20}$alkylenedicarboxylic acid such as adipic acid, sebacic acid or dodecanedioic acid) (for example, a polyamide 46, a polyamide 66, a polyamide 610, a polyamide 612, a polyamide 1010, a polyamide 1012, and a polyamide 1212), a homo- or copolymer of a lactam (e.g., a $C_{4-20}$lactam such as ε-caprolactam or ω-laurolactam) or an aminocarboxylic acid (e.g., a $C_{4-20}$aminocarboxylic acid such as (ω-aminoundecanoic acid) (for example, a polyamide 6, a polyamide 11, a polyamide 12, a polyamide 6/11, and a polyamide 6/12); and a copolyamide having these polyamide components copolymerized therein (for example, a polyamide 66/11, and a polyamide 66/12).

Further, the polyamide-series polymer may have biodegradability. The biodegradable polyamide-series polymer may include a polyester amide as a condensate of the aliphatic diamine component (a $C_{4-10}$alkylenediamine such as tetramethylenediamine or hexamethylenediamine), the aliphatic dicarboxylic acid component (e.g., a $C_{4-20}$alkylenedicarboxylic acid such as adipic acid, sebacic acid or dodecanedioic acid) and the aliphatic diol component (e.g., a $C_{2-12}$alkylene glycol such as ethylene glycol, propylene glycol or butanediol).

(3) Polyurethane-Series Polymer

The polyurethane-series polymer (or resin) may be obtained by a reaction between a diisocyanate compound and a polyol compound (e.g., a diol compound) and, if necessary, a chain-extension agent. As the diisocyanate compound, there may be exemplified an aliphatic diisocyanate compound such as hexamethylene diisocyanate or 2,2,4-trimethylhexamethylene diisocyanate; an alicyclic diisocyanate compound such as 1,4-cyclohexane diisocyanate or isophorone diisocyanate; an aromatic diisocyanate compound such as a phenylene diisocyanate, a tolylene diisocyanate, diphenylmethane-4,4'-diisocyanate or 1,5-naphthalene diisocyanate; an araliphatic diisocyanate compound such as a xylylene diisocyanate; and others.

The polyol compound may include, for example, a polyester polyol, a polyether polyol, and a polycarbonate polyol. Among the polyol compounds, a diol compound (e.g., a polyester diol, a polyether diol, and a polycarbonate diol) is particularly preferred. These polyol compounds may be used singly or in combination.

Examples of a compound available as the diol compound may include a polyester diol (e.g., a polyester diol derived from a $C_{4-12}$aliphatic dicarboxylic acid component such as succinic acid, adipic acid or azelaic acid, and a $C_{2-12}$aliphatic diol component such as ethylene glycol, propylene glycol, butanediol or neopentyl glycol; a polyester diol derived from a $C_{4-12}$lactone component such as ε-caprolactone; and a polyester diol derived from the aliphatic dicarboxylic acid component and/or the aliphatic diol component, and the lactone component), a polyether diol (e.g., a polyethylene glycol, a polypropylene glycol, a polyoxyethylene-polyoxypropylene block copolymer, a polytetramethylene glycol, and a bisphenol A-alkylene oxide adduct), and a polyester ether diol (e.g., a polyester diol obtained by using the polyether diol as part of a diol component).

Further, as the chain-extension agent, there may be used a $C_{2-10}$alkylene glycol such as ethylene glycol or propylene glycol, and in addition, a diamine compound [for example, an aliphatic diamine compound (a linear or branched alkylenediamine such as ethylenediamine, trimethylenediamine or tetramethylenediamine; and a linear or branched polyalkylenepolyamine such as diethylenetriamine, triethylenetetramine, tetraethylenepentamine or dipropylenetriamine), an alicyclic diamine compound (e.g., isophoronediamine), and an aromatic diamine compound (e.g., phenylenediamine, and xylylenediamine)]. These polyurethane-series polymers may be used singly or in combination.

(4) Poly(thio)ether-Series Polymer

Examples of the poly(thio)ether-series polymer (or resin) may include a polyalkylene glycol, a polyphenylene ether-series polymer, and a polysulfide-series polymer (polythioether-series polymer). The polyalkylene glycol may include a homo- or copolymer of an alkylene glycol (e.g., a poly$C_{2-4}$alkylene glycol) such as a polypropylene glycol, a polytetramethylene ether glycol, or a polyoxyethylene-polyoxypropylene block copolymer. These poly(thio)ether-series polymers may be used singly or in combination.

(5) Polycarbonate-Series Polymer

The polycarbonate-series polymer (or resin) may include, for example, an aromatic polycarbonate containing a bisphenol compound (e.g., bisphenol A) as a base unit, and an aliphatic polycarbonate such as diethylene glycol bisallyl carbonate. These polycarbonate-series polymers may be used singly or in combination.

(6) Polysulfone-Series Polymer

Examples of the polysulfone-series polymer (or resin) may include a polysulfone polymer obtained by polycondensation of a dihalogenodiphenyl sulfone (e.g., dichlorodiphenyl sulfone) and a bisphenol compound (e.g., bisphenol A or a metal salt thereof), a polyether sulfone polymer, and a polyallyl sulfone polymer (brand name: RADEL). These polysulfone-series polymers may be used singly or in combination.

(7) Polyolefinic Polymer

The polyolefinic polymer (or resin) may include a homo- or copolymer of an α-$C_{2-6}$olefin, for example, a homo- or copolymer of an olefin such as a polyethylene, a polypropylene, an ethylene-propylene copolymer or a poly(methylpentene-1), and a copolymer of an olefin and a copolymerizable monomer (e.g., an ethylene-vinyl acetate copolymer, an ethylene-(meth)acrylic acid copolymer, and an ethylene-(meth)acrylate copolymer). These polyolefinic polymers may be used singly or in combination.

(8) (Meth)acrylic Polymer

As the (meth)acrylic polymer (or resin), there may be mentioned a homo- or copolymer of a (meth)acrylic monomer [e.g., (meth)acrylic acid, a $C_{1-18}$alkyl (meth)acrylate, a hydroxyalkyl (meth)acrylate, a glycidyl (meth)acrylate, and (meth)acrylonitrile], for example, a poly(meth)acrylate such as a poly(methyl (meth)acrylate), a methyl methacrylate-(meth)acrylic acid copolymer, a methylmethacrylate-acrylate-(meth)acrylic acid copolymer, a methyl methacrylate-(meth)acrylate copolymer, and a (meth)acrylate-styrene copolymer (e.g., an MS polymer). The preferred (meth) acrylic polymer includes a poly($C_{1-5}$alkyl (meth)acrylate), a methyl methacrylate-acrylate copolymer, a (meth)acrylate-styrene copolymer (e.g., an MS polymer), and others. These (meth) acrylic polymers may be used singly or in combination.

(9) Styrenic Polymer

Examples of the styrenic polymer (or resin) may include a homo- or copolymer of a styrenic monomer (e.g., styrene, α-methylstyrene, and vinyl toluene) (for example, a polystyrene, a styrene-vinyl toluene copolymer, and a styrene-α-methylstyrene copolymer), a copolymer of a styrenic monomer and copolymerizable monomer(s) [for example, a copolymer such as a styrene-acrylonitrile copolymer (an AS polymer), a (meth)acrylate-styrene copolymer (e.g., an MS polymer), a styrene-maleic anhydride copolymer, or a styrene-butadiene block copolymer; a styrenic graft copolymer such as an acrylonitrile-acrylate-styrene copolymer (an AAS polymer), an acrylonitrile-chlorinated polyethylene-styrene copolymer (an ACS polymer), or an acrylonitrile-vinyl acetate-styrene copolymer (e.g., an AXS polymer); and a graft polymer obtained by a graft polymerization of at least a styrenic monomer in the presence of a rubber component, for example, a high impact polystyrene (HIPS, or a rubber-grafted polystyrenic polymer), an acrylonitrile-butadiene-styrene copolymer (an ABS polymer), and an acrylonitrile-ethylene propylene rubber-styrene copolymer (an AES polymer)]. These styrenic polymers may be used singly in combination.

(10) Vinyl-Series Polymer

Examples of the vinyl-series polymer (or resin) may include a homo- or copolymer of a vinyl-series monomer, or a copolymer of a vinyl-series monomer and other copolymerizable monomer(s). The vinyl-series monomer may include, for example, a halogen-containing vinyl monomer [for example, a chlorine atom-containing vinyl monomer (e.g., vinyl chloride, vinylidene chloride, and chloroprene), and a fluorine atom-containing vinyl monomer (e.g., fluoroethylene)], and a vinyl carboxylate [for example, a vinyl ester such as vinyl acetate, vinyl propionate, vinyl crotonate or vinyl benzoate]. These vinyl-series polymers may be used singly or in combination.

As the vinyl-series polymer, for example, there may be mentioned a vinyl chloride-series polymer (e.g., a polyvinyl chloride, a polyvinylidene chloride, a vinyl chloride-vinyl acetate copolymer, and a vinylidene chloride-vinyl acetate copolymer), a fluorocarbon polymer (e.g., a polyvinyl fluoride, a polyvinylidene fluoride, a polychlorotrifluoroethylene, a tetrafluoroethylene-hexafluoropropylene copolymer, a tetrafluoroethylene-perfluoroalkylvinyl ether copolymer, and a tetrafluoroethylene-ethylene copolymer), and a vinyl ester-series polymer (e.g., a polyvinyl acetate, a vinyl acetate-ethylene copolymer, an ethylene-vinyl acetate copolymer, a vinyl acetate-vinyl chloride copolymer, and a vinyl acetate-(meth)acrylate copolymer).

Moreover, the vinyl-series polymer may also include a derivative of the vinyl ester-series polymer, for example, a vinyl alcohol-series polymer (e.g., a polyvinyl acetal such as a polyvinyl formal or a polyvinyl butyral; and a saponification product of the vinyl acetate-series copolymer, e.g., an ethylene-vinyl alcohol copolymer). Among these vinyl alcohol-series polymers, the saponification product of the vinyl acetate-series copolymer, in particular the ethylene-vinyl alcohol copolymer, is preferred. In the saponification product of the vinyl acetate-series copolymer, the degree of hydrophilicity may be controlled by adjusting a proportion of a hydrophobic comonomer unit (e.g., an ethylene unit in an ethylene-vinyl alcohol copolymer). In the case of using the saponification product of the vinylacetate-series copolymer as a hydrophilic polymer, the proportion of the hydrophobic monomer unit may be adjusted to, for example, about 10 to 40% by weight from the viewpoint of affinity relative to the auxiliary component (C).

(11) Cellulose Derivative

Examples of the cellulose derivative may include a cellulose ester compound (e.g., a cellulose acetate, and a cellulose phthalate), a cellulose carbamate compound (e.g., a cellulose phenylcarbamate), and a cellulose ether compound (e.g., a cyanoethyl cellulose). These cellulose derivatives may be used singly or in combination.

As the cellulose ester, for example, there may be mentioned an organic acid ester of a cellulose (or an acyl cellulose), e.g., a cellulose acetate (an acetyl cellulose) such as a cellulose diacetate or a cellulose triacetate, a cellulose propionate, a cellulose butyrate, a cellulose acetate propionate, and a cellulose acetate butyrate; an inorganic acid ester of a cellulose such as a cellulose nitrate, a cellulose sulfate or a cellulose phosphate; and a mixed acid ester of a cellulose such as a cellulose nitrate acetate.

The cellulose ether may include, for example, an alkyl cellulose (e.g., a $C_{2-6}$alkyl cellulose such as an ethyl cellulose, an isopropyl cellulose or a butyl cellulose), an aralkyl cellulose (e.g., a benzyl cellulose), and a cyanoethyl cellulose.

In view of biodegradability, it is preferred that the substitution degree of the cellulose derivative is low. For example, the average substitution degree is not more than 2.5, preferably not more than 2 (e.g., about 0.1 to 2), and more preferably not more than 1.5 (e.g., about 0.1 to 1.5).

(12) Thermoplastic Elastomer

Examples of the thermoplastic elastomer may include a polyamide-series elastomer, a polyester-series elastomer, a polyurethane-series elastomer, a polystyrenic elastomer, a polyolefinic elastomer, a polyvinyl chloride-series elastomer, and a fluorine-containing thermoplastic elastomer. These thermoplastic elastomers may be used singly or in combination.

In the case where the thermoplastic elastomer is a block copolymer, the block structure is not particularly limited to a specific one, and may be a triblock structure, a multiblock structure, a star-shaped block structure, and others.

The heat distortion temperature of the polymer component (e.g., a Vicat softening temperature defined by JIS K 7206) may be selected from the range of 60 to 300° C., and for example, may be about 80 to 260° C., preferably about 100 to 240° C. (e.g., about 110 to 240° C.), and more preferably about 120 to 230° C. (e.g., about 130 to 220° C.).

The preferred polymer includes, a water-insoluble thermoplastic resin (or a hydrophobic thermoplastic resin), for example, a polyamide-series polymer, a polyolefinic polymer, a styrenic polymer, a vinyl-series polymer (e.g., a halogen-containing polymer, a vinyl ester-series polymer, and a vinyl alcohol-series polymer), and a biodegradable polymer [for example, a biodegradable polyester-series polymer such as an aliphatic polyester-series polymer (e.g., a polylactic acid-series polymer, and a poly$C_{3-12}$lactone-series polymer) or a polyesteramide, a vinyl alcohol-series polymer, and the cellulose derivative]. Incidentally, in order to melt-knead the polymer component with the auxiliary component (C) easily, a polymer having a hydrophilic group such as an amino group, a hydroxyl group or a carboxyl group may be used as the polymer component. Moreover, in the case where the organic solid component (A) comprises the biodegradable polymer, a polymer particle excellent in biodegradability can be also obtained. Incidentally, with respect to a thermoplastic resin (such as a cellulose derivative) with difficulty in molecular weight measurement by a gel-permeation chromatography, the viscosity-average molecular weight may be adopted. Incidentally, the weight-average molecular weight of the polymer component may be also adjusted depending on a kneading time or a kneading temperature of the polymer component.

In the average molecular weight of the polymer component (e.g., the thermoplastic resin), the weight-average molecular weight or the viscosity-average molecular weight may be, for example, not more than 500,000 (e.g., about 10,000 to 500,000), preferably about 50,000 to 400,000 and more preferably about 10,000 to 350,000, in terms of polystyrene by a gel-permeation chromatography.

(B) Coloring Agent

The coloring agent (B) is not particularly limited to a specific one as far as the coloring agent (B) is a coloring matter usable for coloring (or pigmentation) of a polymer (or resin) or a plastic. In order to distribute the coloring agent to the dispersed phase efficiently and inhibit extraction of the coloring agent to a solvent for eluting or extracting the auxiliary component (C), for example, a water-insoluble dye or pigment (a dye or pigment sparingly soluble in water) [for example, an oil-soluble dye (e.g., a solvent dye), a disperse dye, a vat dye, a sulfide dye, an azoic dye (a naphthol dye), a pigment (e.g., an inorganic pigment, and an organic pigment)] may be used. Moreover, the coloring agent (B) can make the dispersed phase colored to a chromatic color (e.g., yellow, orange, red, violet (or purple), blue, and green) or an achromatic color due to distribution of the coloring agent (B) to the dispersed phase.

Examples of the water-insoluble dye (e.g., the oil-soluble dye, the disperse dye, and the vat dye) may include an azo dye (e.g., a yellow dye such as Disperse Yellow 3; an orange dye such as a dye obtained by diazotizing Fast Orange GC base and coupling the resultant with Naphthol AS, or Disperse Orange 3; a red dye such as Disperse Red 1; and a black dye such as Disperse Black 1), an anthraquinone dye (e.g., a yellow dye such as Vat Yellow 2 or 3; a red dye such as Disperse Red 11 or 15; a violet dye such as Disperse Violet 1; and a blue dye such as Vat Blue 1, 3 or 14, or Solvent Blue 11), a condensed polycyclic quinone-series dye (e.g., a yellow dye such as Vat Yellow 4; an orange dye such as Vat Orange 3; a blue dye such as Vat Blue 4; and a green dye such as Vat Green 1, or Disperse Green 1), a thren-series dye (e.g., a red dye such as Vat Red 23), a indigoid dye (e.g., a violet dye such as Vat Violet 2; and a blue dye such as Vat Blue 1), a phthalocyanine dye, a carbonium ion dye, a nitro dye, a quinoline dye, and a naphthoquinone dye.

The inorganic pigment may include, for example, a white pigment (e.g., titanium dioxide (hydrophobized titanium dioxide), zinc oxide, and zinc sulfide), an extender (e.g., calcium carbonate, barium sulfate, a silica, aluminum hydroxide, a kaolin clay, a talc, and a bentonite), a black pigment (e.g., a carbon black such as a channel black, a furnace black, a thermal black, a lampblack, or Ketjen black), a red pigment (e.g., an iron oxide such as colcothar, a red lead, a molybdenum red, and a cadmium red), a yellow pigment (e.g., litharge, a chrome yellow, a yellow iron oxide, and a cadmium yellow), and a blue pigment (e.g., an iron blue, and an ultramarine blue). Moreover, a ferromagnetic material may be used as an inorganic pigment. Such a ferromagnetic material may include, for example, a ferromagnetic metal (powder) such as iron, cobalt or nickel; a ferromagnetic alloy (powder) such as a magnetite or a ferrite; and a ferromagnetic metal oxide (powder) such as magnetic iron oxide).

As the organic pigment, there may be mentioned an azo-series pigment [for example, an insoluble azo pigment or an azo lake pigment, e.g., a β-naphthol-series azo pigment such as a yellow, orange or red pigment (e.g., Pigment Red 1, 3, 4, 6, 48 or 57:1 (Red No. 202); and a pyrazolone-series azo pigment such as Pigment Red 37 or Pigment Orange 13), a green pigment (e.g., a metal complex of an azo compound, such as Pigment Green 10), and in addition, a condensed azo compound, an azo pigment having a high molecular weight, an azo pigment containing azomethine group, and an azomethine pigment], a phthalocyanine-series pigment [for example, a copper phthalocyanine, e.g., a blue pigment such as Pigment Blue 15 or 15:3 (copper phthalocyanine blue), and Pigment Green 7 (copper phthalocyanine green)], a quinacridone-series pigment (e.g., a violet pigment such as Pigment Violet 19), an isoindolinone-series pigment (e.g., a yellow pigment such as Pigment Yellow 110), a perynone.perylene-series pigment (e.g., a red pigment such as Pigment Red 179 or 190), a thren-series pigment (e.g., a blue pigment such as Pigment Blue 60), a dioxazine pigment (e.g., a violet pigment such as Pigment Violet 23), an anthraquinone-series pigment (e.g., a yellow, orange or red pigment such as Pigment Yellow 108 or 123, or Pigment Red 83 or 177), an indigo or thioindigo-series pigment (e.g., a blue pigment such as indigo, or indigo white; a violet pigment such as indirubin; and a red pigment such as thioindigo, or Pigment Red 88), a black pigment such as aniline black, a diketopyrrolopyrrole-series pigment, a benzimidazolone compound, and a Diarylide yellow (Pigment Yellow 83).

Incidentally, the coloring agent may be a fluorescent pigment or dye, a luminous pigment, and others. The coloring agents may be used singly or in combination.

In the case of using, as the coloring agent, a coloring agent (a water-insoluble dye or pigment) having a higher affinity to the organic solid component (e.g., a polymer component) (A) than an affinity to the water-soluble auxiliary component (C), the coloring agent can be distributed to the dispersed phase (the organic solid component (A)) in the dispersion composition and the efficiency of the coloring agent can be enhanced. Among the coloring agents, it is preferred to use a water-insoluble dye (e.g., an oil-soluble dye) having a chromatic color or black, an inorganic pigment (e.g., a white pigment such as titanium oxide, and a black pigment such as a carbon black), a chromatic colored organic pigment, and others.

In order to color the dispersed phase with the coloring agent by allowing the coloring agent to be contained (or enclosed) in the dispersed phase efficiently, it is necessary that the particle size of the coloring agent (B) is smaller than that of the dispersed phase. The average particle size of the coloring agent (B) may be, for example, not more than 50%, preferably not more than 30% and more preferably not more than 20%, of the average particle size of the dispersed phase (or obtained colored particle). The water-insoluble dye such as an oil-soluble dye may be dispersed in the organic solid component (A) at the molecular level. Moreover, the average particle size of the pigment may be selected from the wide range of about 2 nm to 10 μm, and for example, may be about 3 nm to 1 μm, preferably about 5 to 500 nm, and more preferably about 10 to 300 nm. Incidentally, in the case of reducing the size of the particle (or the dispersed phase), it is advantageous to select the oil-soluble dye because the oil-soluble dye is dispersible at the molecular level.

Incidentally, in order to disperse the coloring agent (B) in the organic solid component (A) uniformly, the coloring agent (B) may be used in the form of a master batch obtained by precedently diluting the coloring agent with a thermoplastic resin [e.g., the organic solid component (A), or an organic solid component (e.g., a thermoplastic resin) miscible with the organic solid component (A)]. The master batch may be obtained by mixing the organic solid component [for example, a thermoplastic resin (e.g., a polymer of the same kind as the polymer component)] with the coloring agent by a conventional kneader (e.g., the above-mentioned kneader). The concentration of the coloring agent in the master batch is not particularly limited to a specific one, and may be a conventional concentration, e.g., about 5 to 20% by weight.

In the dispersed phase, the proportion of the coloring agent (B) may be selected from the wide range of about 0.001 to 200 parts by weight (e.g., about 0.001 to 100 parts by weight) relative to 100 parts by weight of the organic solid component (A), and for example, may be about 0.001 to 70 parts by weight (e.g., about 0.001 to 50 parts by weight), preferably about 0.01 to 45 parts by weight (e.g., about 0.02 to 30 parts by weight) and more preferably about 0.05 to 20 parts by weight relative to 100 parts by weight of the organic solid component (A).

(C) Water-Soluble Auxiliary Component

The water-soluble auxiliary component comprises at least an oligosaccharide (C1). Moreover, in order to adjust a thermal fusing property of the oligosaccharide, the water-soluble auxiliary component may further comprise a water-soluble plasticizing component (C2) for plasticizing the oligosaccharide. By using the oligosaccharide (C1) and the water-soluble plasticizing component (C2) in combination, the viscosity of the water-soluble auxiliary component (C) can be adjusted in kneading with the organic solid component (A). Incidentally, the colored organic solid particle (e.g., a polymer particle) may be obtained by forming a dispersion composition by using the water-soluble auxiliary component in combination with the organic solid component and the coloring agent, and then suitably eluting or washing the water-soluble auxiliary component from the dispersion composition.

(C1) Oligosaccharide

The oligosaccharide (C1) is classified broadly into two groups: a homooligosaccharide condensed by dehydration of 2 to 10 monosaccharide molecules through glycoside linkage(s), and a heterooligosaccharide condensed by dehydration of 2 to 10 molecules of at least not less than two kinds of monosaccharides and/or sugar alcohols through glycoside linkage(s). The oligosaccharide (C1) may include, for example, a disaccharide to a decasaccharide, and usually, an oligosaccharide of a disaccharide to a hexasaccharide is employed. The oligosaccharide is usually a solid at a room temperature. Incidentally, these oligosaccharides may be an anhydrate. Moreover, in the oligosaccharide, a monosaccharide may bond (or link) with a sugar alcohol. Incidentally, the oligosaccharide may be an oligosaccharide composition comprising a plurality of sugar components. Such an oligosaccharide composition is sometimes simply referred to as an oligosaccharide. These oligosaccharides (or oligosaccharide compositions) may be used singly or in combination.

Examples of the disaccharide may include a homooligosaccharide such as a trehalose (e.g., α, α-trehalose, β,β-trehalose, and α,β-trehalose), kojibiose, nigerose, maltose, isomaltose, sophorose, laminaribiose, cellobiose or gentiobiose; and a heterooligosaccharide such as lactose, sucrose, palatinose, melibiose, rutinose, primeverose or turanose.

As the trisaccharide, there may be mentioned a homooligosaccharide such as maltotriose, isomaltotriose, panose or cellotriose; a heterooligosaccharide such as manninotriose, solatriose, melezitose, planteose, gentianose, umbelliferose, lactosucrose or raffinose; and others.

Examples of the tetrasaccharide may include a homooligosaccharide such as maltotetraose or isomaltotetraose; and a heterooligosaccharide such as stachyose, cellotetraose, scorodose, lychnose, or a tetraose having a sugar or sugar alcohol attached to a reducing end of panose.

Among these tetrasaccharides, the tetraose having a monosaccharide or sugar alcohol attached to a reducing end of panose is disclosed in, for example, Japanese Patent Application Laid-Open No. 215892/1998 (JP-10-215892A), and may include a tetraose having a monosaccharide (such as glucose, fructose, mannose, xylose or arabinose) or a sugar alcohol (such as sorbitol, xylitol or erythritol) attached to a reducing end of panose.

The pentasaccharide may include a homooligosaccharide such as maltopentaose or isomaltopentaose; and a heterooligosaccharide such as a pentaose having a disaccharide attached to a reducing end of panose. The pentaose having a disaccharide attached to a reducing end of panose is also disclosed in, for example, Japanese Patent Application Laid-Open No. 215892/1998 (JP-10-215892A), and may include a pentaose having a disaccharide (such as sucrose, lactose, cellobiose or trehalose) attached to a reducing end of panose.

Examples of the hexasaccharide may include a homooligosaccharide such as maltohexaose or isomaltohexaose.

The oligosaccharide preferably comprises at least a tetrasaccharide from the viewpoint of a melt-kneading property with the organic solid component.

The oligosaccharide may be an oligosaccharide composition produced by decomposition of a polysaccharide. The oligosaccharide composition usually contains a tetrasaccharide. The oligosaccharide composition may include, for example, a starch sugar (a saccharification product of a starch (or a saccharified starch)), a galactooligosaccharide, a coupling sugar, a fructooligosaccharide, a xylooligosaccharide, a soybean oligosaccharide, a chitin oligosaccharide, and a chitosan oligosaccharide.

For example, the starch sugar is an oligosaccharide composition obtained by making an acid or glucoamylase or the like act on a starch, and may be a mixture of an oligosaccharide obtained by bonding a plurality of glucoses to each other. The starch sugar may include, for example, a reduced starch-saccharified manufactured by Towa Chemical Industry Co., Ltd. (brand name "PO-10", the tetrasaccharide content is not less than 90% by weight).

The galactooligosaccharide is an oligosaccharide composition obtained by making β-galactosidase or the like act on lactose, and may be a mixture of galactosyllactose and a galactose-(glucose)$_n$ ("n" denotes an integer of 1 to 4).

The coupling sugar is an oligosaccharide composition obtained by making cyclodextrin synthetase (CGTase) act on a starch and sucrose, and may be a mixture of a (glucose)$_n$-sucrose ("n" denotes an integer of 1 to 4).

The fructooligosaccharide is an oligosaccharide composition obtained by making fructofuranosidase act on sucrose, and may be a mixture of a sucrose-(fructose)$_n$ ("n" denotes an integer of 1 to 4).

Concerning these oligosaccharide compositions, in order to inhibit rapid decrease of the viscosity in melt-kneading, the content of the trisaccharide or the tetrasaccharide (in particular, the tetrasaccharide) in the oligosaccharide composition may be, for example, not less than 60% by weight (about 60 to 100% by weight), preferably not less than 70% by weight (about 70 to 100% by weight), more preferably not less than 80% by weight (about 80 to 100% by weight), and particularly not less than 90% by weight (about 90 to 100% by weight).

The oligosaccharide may be a reducing-type (maltose-type), or a non-reducing type (trehalose-type). The reducing-type oligosaccharide is preferred because of excellence in heat resistance.

The reducing-type oligosaccharide is not particularly limited to a specific one as far as the oligosaccharide has a free aldehyde group or ketone group to exhibit a reducing property. For example, the reducing-type oligosaccharide may include a disaccharide such as kojibiose, nigerose, maltose, isomaltose, sophorose, laminaribiose, cellobiose, gentiobiose, lactose, palatinose, melibiose, rutinose, primeverose or turanose; a trisaccharide such as maltotriose, isomaltotriose, panose, cellotriose, manninotriose or solatriose; a tetrasaccharide such as maltotetraose, isomaltotetraose, cellotetraose or lychnose; a pentasaccharide such as maltopentaose or isomaltopentaose; and a hexasaccharide such as maltohexaose or isomaltohexaose.

Since the oligosaccharide is generally a natural polysaccharide derivative, or a product derived from a natural product being manufactured by reducing the derivative, use of the oligosaccharide can reduce in the burden on the environment.

In order to effectively disperse the organic solid component and the auxiliary component by kneading, it is desirable that the oligosaccharide has a high viscosity. More specifically, in the case where the viscosity of the 50% by weight aqueous solution of the oligosaccharide is measured at a temperature of 25° C. by using a B-type viscometer, the viscosity is not lower than 1 Pa·s (e.g., about 1 to 500 Pa·s), preferably not lower than 2 Pa·s (e.g., about 2 to 250 Pa·s, and in particular about 3 to 100 Pa·s), more preferably not lower than 4 Pa·s (e.g., about 4 to 50 Pa·s), and particularly not lower than 6 Pa·s (e.g., about 6 to 50 Pa·s), and it is preferred to use an oligosaccharide having a high viscosity.

Moreover, the melting point or softening point of the oligosaccharide (C1) is preferably higher than the heat distortion temperature of the organic solid component (e.g., a polymer component) (A) (e.g., a melting point or softening point of the organic solid component (A), and a Vicat softening temperature defined by JIS K 7206). Incidentally, depending on the kind or species of the oligosaccharide [e.g., in the case of a starch sugar such as a reduced starch saccharified], the oligosaccharide sometimes decomposed (thermally decomposed) without showing a melting point or softening point. In such a case, the decomposition temperature may be considered as the "melting point or softening point" of the oligosaccharide (C1).

The temperature difference between the melting point or softening point of the oligosaccharide (C1) and the heat distortion temperature of the organic solid component (A) is, for example, not less than 1° C. (e.g., about 1 to 80° C.), preferably not less than 10° C. (e.g., about 10 to 70° C.), and more preferably not less than 15° C. (e.g., about 15 to 60° C.). The melting point or softening point of the oligosaccharide (C1) may be selected from the range of 70 to 300° C. depending on the kind of the organic solid component (A) and other factor(s), and may be, for example, about 90 to 290° C., preferably about 100 to 280° C. (e.g., about 110 to 270° C.), and more preferably about 120 to 260° C. (e.g., about 130 to 260° C.). Incidentally, an anhydride of an oligosaccharide generally has a high melting point or softening point. For example, in the case of a trehalose, the melting point of the dihydrate is 97° C. and that of the anhydride is 203° C. In the case where the melting point or softening point of the oligosaccharide is higher than the heat distortion temperature of the organic solid component (A) (e.g., a polymer component), the oligosaccharide can be not only prevented from rapid deterioration of the viscosity in melt-kneading but also inhibited from thermal degradation.

(C2) Water-Soluble Plasticizing Component

The water-soluble plasticizing component (C2) is enough to just express a phenomenon that the oligosaccharide (C1) hydrates to turn into a syrup state, and may include, for example, a saccharide, and a sugar alcohol. These plasticizing components may be used singly or in combination.

(a) Saccharide

As the saccharide, a monosaccharide and/or a disaccharide is usually employed for plasticizing the oligosaccharide (C1) effectively. These saccharides may be used singly or in combination.

Examples of the monosaccharide may include a triose, a tetrose, a pentose, a hexose, a heptose, an octose, a nonose, and a decose. These compounds may be an aldose or ketose compound, a dialdose compound (for example, a compound which is a saccharide derivative and has aldehyde groups in both ends of the carbon chain, such as tetraacetylgalactohexodialdose, ido-hexodialdose or xylo-pento-dialdose), a monosaccharide having a plurality of carbonyl groups (e.g., an aldoalko-ketose such as osone or onose), a monosaccharide having a methyl group (e.g., a methyl sugar such as altromethylose), a monosaccharide having an acyl group (in particular, e.g., a $C_{2-4}$acyl group such as acetyl group) (for example, an acetylated product of the above-mentioned aldose compound, e.g., an acetylated product such as a pentaacetylated product of an aldehyde glucose), a saccharide having an introduced carboxyl group (e.g., a saccharic acid or a uronic acid), a thiosugar, an amino sugar, a deoxy sugar, or others.

Concrete examples of such a monosaccharide may include a tetrose (e.g., erythrose, and threorose), a pentose (e.g., arabinose, ribose, lyxose, deoxyribose, and xylose), and a hexose (e.g., allose, altrose, glucose, mannose, gulose, idose, galactose, fructose, sorbose, fucose, rhamnose, talose, galacturonic acid, glucuronic acid, mannuronic acid, and glucosamine).

Moreover, the monosaccharide may be a cyclic isomer having a cyclic structure formed through a hemiacetal linkage. It is not necessary that the monosaccharide has an optical activity (or rotatory polarization), and the monosaccharide may be any one of D-form, L-form, or DL-form. These monosaccharides may be used singly or in combination.

The disaccharide is not particularly limited to a specific one as far as the disaccharide can plasticize the oligosaccharide (C1). For example, among the above-mentioned disaccharides, there may be exemplified a disaccharide having a low melting point or low softening point (e.g., gentiobiose, melibiose, and trehalose (dehydrate)), and a disaccharide corresponding to a homo- and heterodisaccharide of the above-mentioned monosaccharide (e.g., an aldobiouronic acid such as glucuronoglucose in which glucuronic acid binds to glucose through an $\alpha$-1,6-glycoside linkage).

The saccharide is preferably a reducing sugar in terms of having an excellent thermal stability. Examples of such a saccharide include a free monosaccharide, and in addition, a reducing sugar having a low melting point or low softening point (e.g., gentiobiose, and melibiose) among the disaccharides.

(b) Sugar Alcohol

As the sugar alcohol, a linear (or chain) sugar alcohol such as an alditol (glycitol) or a cyclic sugar alcohol such as an inositol may be used, and usually, the linear sugar alcohol may be employed. These sugar alcohols may be used singly or in combination.

Examples of the linear sugar alcohol may include a tetrytol (e.g., threitol, and erythritol), a pentitol [e.g., pentaerythritol, arabitol, ribitol (adonitol), xylitol, and lyxitol], a hexitol [e.g., sorbitol, mannitol, iditol, gulitol, talitol, dulcitol (galactitol), allo-dulcitol (allitol), and altritol], a heptitol, an octitol, a nonitol, a decitol, and a dodecitol.

Among these sugar alcohols, the preferred sugar alcohol includes erythritol, pentaerythritol, arabitol, ribitol, xylitol, sorbitol, dulcitol and mannitol. The sugar alcohol often comprises at least one sugar alcohol selected from the group consisting of erythritol, pentaerythritol and xylitol.

The plasticizing component (C2) may be a liquid (or in a syrup state) at a room temperature (e.g., about 15 to 20° C.), and from the viewpoint of handleability and others, the plasticizing component (C2) is usually a solid in many cases. In the case where the auxiliary component (C) comprises the oligosaccharide (C1) and the plasticizing component (C2), the plasticizing component (C2) can effectively plasticize or soften the oligosaccharide (C1) even when the oligosaccharide (C1) is a thermally decomposable oligosaccharide not having a clear melting point or softening point.

The melting point or softening point of the plasticizing component (C2) is usually not higher than the heat distortion temperature of the organic solid component (e.g., a polymer component) (A) (for example, not higher than a melting point or softening point of the organic solid component (A), and a Vicat softening temperature defined by JISK 7206). Incidentally, some plasticizing components are molten at a temperature lower than the actual melting point when coexisting with the oligosaccharide while having a high melting point (e.g., a melting point of not lower than 200° C.). For example, pentaerythritol exerts a plasticizing effect on the oligosaccharide and melts at a temperature (e.g., at about 160 to 180° C.) lower than the actual melting point (260° C.). The plasticizing component having such a high melting point cannot be singly utilized because of being not molten at the heat distortion temperature of the organic solid component (e.g., a polymer component). However, such a plasticizing component can be utilized effectively in combination with the oligosaccharide. Incidentally, in the plasticizing component exerting a plasticizing effect on the oligosaccharide (e.g., pentaerythritol) at a temperature lower than the actual melting point, the temperature at which a plasticizing effect on the oligosaccharide is exerted may be regarded as the "melting point or softening point" of the plasticizing component (C2).

The melting point or softening point of the auxiliary component (C) may be not higher or lower than the heat distortion temperature of the organic solid component (e.g., a polymer component) (A). It is sufficient that the organic solid component (A) and the auxiliary component (C) are molten or soften at least at a kneading temperature (or fabrication temperature). For example, the temperature difference between the melting point or softening point of the auxiliary component (C) and the heat distortion temperature of the organic solid component (e.g., a polymer component) (A) may be selected from the range of 0 to 100° C. For example, the temperature difference may be about 3 to 80° C. (e.g., about 3 to 55° C.), preferably about 5 to 60° C. (e.g., about 5 to 45° C.), and more preferably about 5 to 40° C. (e.g., about 10 to 35° C.). Incidentally, in the case where the temperature difference between the melting point or softening point of the auxiliary component (C) and the heat distortion temperature of the organic solid component (e.g., a polymer component) (A) is small (e.g., in the case where the temperature difference is about 0 to 20° C.), there is an advantage that the dispersion shape can be fixed in a short time by an auxiliary component (C) (e.g., a sugar component) having a high solidification rate.

Further, the melt flow rate of the auxiliary component (C) (e.g., an auxiliary component comprising the oligosaccharide (C1) and the plasticizing component (C2)) may be, for example, not less than 1 (e.g., about 1 to 40), preferably not less than 5 (e.g., about 5 to 30), and more preferably not less than 10 (e.g., about 10 to 20) when measured the melt flow rate defined by JIS K 7210 at a temperature 30° C. higher than the heat distortion temperature of the organic solid component (e.g., a polymer component) (A) [e.g., at a temperature 30° C. higher than a melting point or softening point of the organic solid component (A), and the Vicat softening temperature].

In the auxiliary component (C), the ratio (weight ratio) of the plasticizing component (C2) is selected from the range that the plasticizing component can plasticize the oligosaccharide (C1) efficiently without localizing by aggregation or other reason accompanying melt-kneading. For example, the ratio of the oligosaccharide (C1) relative to the plasticizing component (C2) [the oligosaccharide (C1)/the plasticizing component (C2)] may be selected from 99/1 to 50/50, and may be preferably about 95/5 to 60/40 and more preferably about 90/10 to 70/30.

The ratio (weight ratio) of the organic solid component (A) relative to the auxiliary component (C) may be selected depending on the kinds or viscosities of the organic solid component and the auxiliary component, the miscibility between the organic solid component and the auxiliary component, or other factor(s), and is not particularly limited to a specific one. The ratio [the organic solid component (A)/the auxiliary component (C)] may be usually selected from the range that formability (or moldability) of the dispersion composition is not impaired, and may be, for example, about 55/45 to 1/99, preferably about 50/50 to 5/95 and more preferably about 45/55 to 10/90.

In the present invention, the dispersion composition or the composition may contain, if necessary, various additives, for example, other additive such as a filler (e.g., a particulate filler, and a fibrous filler such as a glass fiber), a plasticizer or a softener, an agent for imparting photodegradable property (e.g., an anatase-formed titanium oxide), a lubricant, a stabilizer (e.g., a heat stabilizer, an antioxidant, an ultraviolet ray absorbing agent, and a weather (light) stabilizer), an ultraviolet-scattering agent (e.g., a powder of a metal oxide such as titanium oxide, zirconium oxide, zinc oxide, or iron oxide), a dispersing agent, a flame retardant, an antistatic agent, a charge control agent (e.g., a positive charge control agent such as a nigrosin dye, a triphenylmethane-series dye, a quaternary ammonium salt, a guanidine compound, an imidazole compound, or an amine-series compound; and a negative charge control agent such as a metal complex of salicylic acid, a metal complex of an azo dye, a copper phthalocyanine dye, a nitroimidazole derivative, or a urea derivative), a superplasticizer (or an agent for imparting fluidization), a wax [for example, an olefinic wax such as a polyethylene wax, an ethylene copolymer wax, or a polypropylene wax; a paraffin wax; a higher fatty acid or a derivative thereof (e.g., a salt, a polyhydric alcohol ester, and an amide); and an ester-series wax], or a crosslinking agent. Incidentally, the additive may be contained in any of the dispersed phase and the matrix constituting the dispersion composition.

The other additive may be selected depending on applications of the colored fine particle, or others. For example, in an application of a cosmetic (e.g., a foundation, a face powder, and a blusher), the ultraviolet ray absorbing agent (e.g., a benzophenone-series absorbing agent, a cinnamic acid-series absorbing agent, a p-aminobenzoic acid-series absorbing agent, a salicylic acid-series absorbing agent, a dibenzoylmethane-series absorbing agent, urocanic acid or an ester thereof, β-isopropyl-furanone, and β-carotene), the ultraviolet-scattering agent, and others may be used. In an application of image recording material such as a toner, for example, the charge control agent, the superplasticizer, the wax, and others may be used. Moreover, in an application of paint and varnish, or the like, for example, there may be used the crosslinking agent, the weather (light) stabilizer, the ultraviolet ray absorbing agent, and the superplasticizer.

In these additives, the amount of each additive may be an effective amount, and for example, the total amount of the additives may be selected from the range of about 0 to 100 parts by weight relative to 100 parts by weight of the organic solid component. For example, the total amount of the additives may be about 0 to 50 parts by weight (e.g., about 0 to 30 parts by weight), preferably about 0.05 to 20 parts by weight (e.g., about 0.1 to 20 parts by weight), and more preferably about 0.1 to 10 parts by weight (e.g., about 0.5 to 10 parts by weight), relative to 100 parts by weight of the organic solid component.

In the dispersion composition of the present invention, the average particle size of the dispersed phase is not particularly limited to a specific one, and may be selected from the range of about 0.1 μm to 1 mm (e.g., about 0.1 to 800 μm) as usage. For example, the average particle size may be, for example, about 0.1 to 500 μm, preferably about 0.1 to 100 μm (e.g., about 0.5 to 80 μm), more preferably about 0.2 to 50 μm (e.g., about 0.5 to 50 μm), and particularly about 1 to 40 μm (e.g., about 1 to 20 μm). Moreover, the average particle size of the dispersed phase may be, for example, about 0.1 to 10 μm (e.g., about 0.2 to 5 μm), and preferably about 0.5 to 3 μm (e.g., about 0.5 to 2 μm).

In the present invention, the particle size of the dispersed phase can be uniformized and the particle size distribution of the particle size can be narrowed. The coefficient (%) of variation of the average particle size in the dispersed phase ([the standard deviation of the particle size/the average particle size]×100) may be, for example, not more than 60 (e.g., about 5 to 60), preferably not more than 55 (e.g., about 5 to 55) and more preferably not more than 50 (e.g., about 10 to 50).

In the dispersion composition of the present invention, it is sufficient that the configuration (or shape) of the dispersed phase is a particle shape. For example, the configuration (or shape) of the dispersed phase may be a spherical shape, an elliptical shape, a polyhedral shape, a prismatic shape, a columnar (or cylindrical) shape, a rod-like shape, and an amorphous shape, and others. The preferred shape of the disperse phase is a spherical shape. The spherical dispersion composition (or spherical particle) is not limited to a finely spherical shape, and for example, includes a shape having a length ratio of a major axis relative to a minor axis of, e.g., about 1.5/1 to 1/1. The length ratio of the major axis relative to the minor axis [the major axis/the minor axis] may be preferably about 1.3/1 to 1/1 (e.g., about 1.2/1 to 1/1), and more preferably about 1.1/1 to 1/1.

The dispersion composition may be prepared by kneading the organic solid component (A), the coloring agent (B) (including a master batch containing the coloring agent) and the auxiliary component (C), and usually, the kneaded composition is often shaped (or molded) to prepare a preliminary shaped article. The kneading operation may be carried out by using a conventional kneading machine (e.g., a uniaxial or biaxial screw extruder, a kneader, and a calendar roll). Moreover, in advance of kneading, each of components may be preliminarily converted into a powder form by a machine such as a freeze grinder or may be preliminarily kneaded by a Henschel mixer, a tumbler mixer, a ball mill or others.

Examples of the shaping (or molding) method may include an extrusion molding, an injection molding, a blow molding, and a calendar molding. In view of productivity or easiness of processing, an extrusion molding or an injection molding is usually applied. The shape of the preliminary shaped article (or dispersion composition) is not particularly limited to a specific one, and may be a zero-dimensional shape (e.g., a particle shape, and a pellet shape), a one-dimensional shape (e.g., a strand shape, and a rod or bar shape), a two-dimensional shape (e.g., a plate shape, a sheet shape, and a film shape), a three-dimensional shape (e.g., a tubular shape, and a block shape), and others. Considering the elution property (or elution capability) of the auxiliary component, it is desirable to process (or shape) the dispersion composition into a strand shape, a rod or bar shape, a sheet shape, or a film shape.

The water-soluble auxiliary component may be eluted from the kneaded matter, and the water-soluble auxiliary component is usually eluted by shaping (or molding) after kneading.

Incidentally, it is possible to appropriately set the kneading temperature or processing (or shaping) temperature (or fabrication temperature) depending on a raw material to be used (e.g., the organic solid component and the auxiliary component). For example, the kneading temperature or processing temperature is about 90 to 300° C., preferably about 110 to 260° C. (e.g., about 170 to 250° C.), more preferably about 140 to 240° C. (e.g., about 170 to 240° C.), and particularly about 170 to 230° C. (e.g., about 180 to 220° C.). In order to avoid thermal decomposition of the auxiliary component (the oligosaccharide and the plasticizing component), the kneading temperature or processing temperature may be set to a temperature not higher than 230° C. Moreover, the kneading time may be, for example, selected from the range of 10 seconds to one hour, and is usually about 30 seconds to 45 minutes, and preferably about 1 to 30 minutes (e.g., 1 to 10 minutes).

The molten mixture (e.g., a kneaded matter, and a preliminary shaped article) obtained by kneading and/or processing (or fabrication) may be suitably cooled, if necessary. By cooling the molten mixture in such a way, even in the case where the organic solid component (A), the coloring agent (B) and the auxiliary component (C) are miscible with one another in the molten state, a dispersed phase can be formed due to differences in surface tension and solidification rate such as crystallization rate between the organic solid component and the auxiliary component along with cooling.

The cooling temperature may be at least about 10° C. lower than the heat distortion temperature of the organic solid component (e.g., a polymer component) (A) or the melting point or softening point of the auxiliary component (C), and for example, may be about 10 to 100° C. lower than the above temperature (the heat distortion temperature of the organic solid component, or the melting point or softening point of the auxiliary component), preferably about 15 to 80° C. lower than the above temperature, and more preferably about 20 to 60° C. lower than the above temperature. Specifically, for example, the cooling temperature may be selected from the range of 5 to 150° C. depending on the kind of the organic solid component or the auxiliary component, and may be, for example, about 10 to 120° C. (e.g., about 10 to 60° C.), preferably about 15 to 100° C. (e.g., about 15 to 50° C.), and more preferably about 20 to 80° C. (e.g., about 20 to 40° C.). The cooling time may be suitably set according to the kind of the organic solid component or the auxiliary component, the cooling temperature, and others, and may be selected, for example, from the broad range of 30 seconds to 20 hours. For example, the cooling time may be about 45 seconds to 10 hours, preferably about one minute to 5 hours (e.g., about one minute to one hour), and more preferably about 1.5 to 30 minutes.

Moreover, by adjusting the miscibility between the organic solid component and the auxiliary component, the kneading conditions (e.g., the kneading time, and the kneading temperature), the processing temperature and the cooling conditions (e.g., the cooling time, and the cooling temperature), the average particle size of the dispersed phase (or particle) may be changed or the width of the particle size distribution may be further narrowed.

Thus obtained dispersion composition has a phase separation structure in which the auxiliary component (C) forms a continuous phase of an islands-in-the-sea structure and the organic solid component (A) and the coloring agent (B) form an independent dispersed phase thereof. Therefore, the auxiliary component can be quickly eluted or extracted to give the dispersed phase (the colored organic solid phase) as a particle.

[Production Process of Colored Particle]

According to the present invention, a particle comprising the organic solid component (A) and the coloring agent (B) is produced by eluting the water-soluble auxiliary component (C) from the dispersion composition.

The elution (or washing) of the water-soluble auxiliary component (C) may be carried out by using an aqueous solvent, for example, water, and a water-soluble solvent [e.g., an alcohol compound (e.g., methanol, ethanol, propanol, isopropanol, and butanol), and an ether compound (e.g., a cellosolve, and a butyl cellosolve)]. These aqueous solvents may be used singly or in combination. The preferred elution solvent is water because of the low burden on the environment and the industrial cost reduction.

The elution of the auxiliary component (C) may be conducted by a conventional method, for example, by immersing and dispersing the dispersion composition (or preliminary shaped article) in the aqueous medium, and eluting or washing the auxiliary component from the dispersion composition (or moving over the auxiliary component to the phase of the aqueous solvent). In the case where the dispersion composition (or preliminary shaped article thereof) is immersed in the aqueous medium, the water-soluble auxiliary component forming the matrix of the dispersion composition is gradually eluted and the dispersed phase (particle) is dispersed in the mixture obtained by the elution. In order to accelerate the dispersion and elution of the auxiliary component, stirring or other means may be suitably conducted.

Incidentally, according to the present invention, since a coloring agent having a higher affinity to the organic solid component (A) than the water-soluble auxiliary component (C) (e.g., an oil-insoluble dye or pigment) is used as the coloring agent (B), the coloring agent can be distributed to the dispersed phase (dispersion particle) without being substantially distributed to the aqueous phase (the water-soluble auxiliary component (C) and the aqueous medium), and the efficiency of the coloring agent can be enhanced. Therefore, the present invention is advantageous from industrial point of view. In the case of using, as the coloring agent, a dye or pigment having a higher degree of affinity to the organic solid component (A) than that of affinity to the water-soluble auxiliary component (C), the distribution factor of the coloring agent to the dispersed phase can be increased, the content of the coloring agent in the eluate can be drastically decreased (substantially to zero), and the burden on the environment can be reduced.

The auxiliary component may be eluted, for example, under an applied pressure, and usually, can be eluted under an atmospheric pressure (e.g., about $1 \times 10^5$ Pa) or a reduced pressure. Moreover, the elution temperature of the auxiliary component may be appropriately established depending on the organic solid component and the auxiliary component. The elution temperature of the auxiliary component is usually a temperature lower than the melting point or softening point of the organic solid material, and is, for example, about 10 to 100° C., preferably about 25 to 90° C., and more preferably 30 to 80° C. (e.g., about 40 to 80° C.). Since the water-soluble auxiliary component of the present invention is easily soluble in water, a large amount of water is not required. Moreover, since the auxiliary component has a low molecular weight, the viscosity of the resultant mixture is low and the obtained particle can be easily collected.

The colored particle may be collected from a dispersion liquid containing the dispersed particle by a conventional separation (collecting) method, e.g., filtration and centrifugation. It is desirable that the obtained colored particle has no residual auxiliary component. However, for example, in view of cost reduction of the washing process, the multiple particle may have a small amount of the residual auxiliary component. The small amount of the auxiliary component in the colored particle does not significantly affect the obtained particle and has a high safety because the auxiliary component is a compound derived from a natural product (including a food product or a food additive). Incidentally, the proportion of the auxiliary component (C) in the colored particle may be, for example, not more than 3% by weight.

Incidentally, the auxiliary component eluted or extracted with the solvent may be collected by a conventional separation means (e.g., distillation, concentration, recrystallization, and drying (freeze drying)).

The present invention also includes a colored organic solid particle (e.g., a polymer particle) obtained by the production process. The configuration (or shape), the average particle size and the coefficient of variation of the average particle size of the particle (e.g., a polymer particle) may be selected from the same range as the above-mentioned dispersed phase. Moreover, the length ratio of the major axis relative to the minor axis in the particle may be also selected from the same range as the above-mentioned dispersed phase. Incidentally, the configuration (or shape) or size of the particle is retained that of the intact dispersed phase unless the organic solid component (A) is eluted in the elution solvent (aqueous solvent). Incidentally, if necessary, the particle size of the particle may be made uniform by a means such as classification.

INDUSTRIAL APPLICABILITY

In the case where the colored particle (e.g., a colored polymer particle) of the present invention is visually observed, the colored particle often expresses a more whitish color than the original color of the coloring agent (C) by light-scattering property of the particle. By using such a light-scattering effect, the colored particle may be available for a cosmetic (e.g., a foundation, a face powder, a blusher, and an eye shadow) or others. Moreover, the colored particle may be also utilized for an image-recording material such as an ink (including a polymer ink) or a colored toner usable for an ink jet printing or others, a paint and varnish or a coating agent (e.g., a powdered paint, or a coating material for a slurry painting), and a coloring agent for a print ink. Incidentally, the colored particle may be used for improving the mix aptitude to other fine particle (e.g., an inorganic fine particle), or may be used as an antiblocking agent (e.g., an antiblocking agent for a shaped article), a spacer (e.g., a spacer for a liquid crystal), an additive for sheet or film, an abrasive for chemical and mechanical polishing (CMP) of semiconductor, and others.

Moreover, the colored polymer particle obtained by using a biodegradable polymer component is useful for a raw material or additive in a fine chemical field such as an agricultural chemical, a medicine (or a pharmaceutical), a paint and varnish (e.g., a powdered paint, and a ship bottom paint), a coating agent or an adhesive agent because of being excellent in biodegradability. Further, the colored polymer particle may be also utilized as an additive to a film or sheet for agriculture, forestry and fisheries, civil engineering, and construction; a material for sanitary goods (e.g., a disposable diaper); a medical material requiring biodegradation and bioabsorbability; or a sustained release material requiring sustained release.

EXAMPLES

The following examples are intended to describe this invention in further detail and should by no means be interpreted as defining the scope of the invention.

Examples 1 to 11 and Comparative Examples 1 to 3

In each Examples, a polymer composition comprising a polymer component, a water-soluble auxiliary component and a coloring agent component having a formulation shown in Tables 1 and 2 was melt-kneaded at a preset temperature (processing temperature) of 200° C. for 5 minutes by using a brabender (manufactured by Toyo Seiki Seisaku-sho, Ltd., laboplastmill), and then cooled to prepare a dispersion composition. The obtained dispersion composition was immersed in hot water of 60° C. to give a suspension of a polymer particle. The insoluble matter was separated from the suspension by using a membrane (having a pore size of 0.45 µm, and made of a polyvinylidene fluoride) to collect the polymer fine particle and an aqueous solution (extracted aqueous solution) containing the auxiliary component dissolved therein, separately. The color of the obtained polymer fine particle and that of the extracted aqueous solution containing the auxiliary were visually observed.

Moreover, after drying the polymer fine particle, the configuration (or shape) of the polymer particle was observed by using a scanning electron microscope, and the weight-average molecular weight of the polymer particle and the average particle size thereof were determined in accordance with the following manner. FIG. 1 shows a scanning electron microscope (3000 magnifications) of a colored polymer particle obtained in Example 2.

(Weight-Average Molecular Weight)

The weight-average molecular weight was calculated in terms of a standard polystyrene by a gel-permeation chromatography (GPC).

(Average Particle Size)

The dried polymer particle was redispersed at an adequate amount in pure water to prepare a suspension, and the number average particle size of the polymer fine particle was determined by using a laser diffraction particle size analyzer (manufactured by Shimadzu Corporation, "SALD-2000J"). Moreover, concerning the polymer fine particle, the standard deviation and the coefficient of variation relative to 100 particles selected at random were calculated. Incidentally, the coefficient of variation was determined in accordance with the following formula:

Coefficient of variation (%)=Standard deviation/Average particle size×100

Incidentally, in Examples and Comparative Examples, the following components were used.

(A) Polymer Component

Polymer 1: Polystyrene polymer (manufactured by Toyo Styrene Co., Ltd., "GPPS HRM63C")

Polymer 2: Nylon 12 polymer (manufactured by Daicel-Degussa Ltd., "DIAMID L1640")

Polymer 3: Butanediol-succinic acid-caprolactone ternary copolymer (manufactured by Daicel Chemical Industries, Ltd., "CBS-178", weight-average molecular weight of 170000)

Polymer 4: Butanediol-succinic acid-caprolactone ternary copolymer (manufactured by Daicel Chemical Industries, Ltd., "CBS-17X", weight-average molecular weight of 140000)

Polymer 5: Polystyrenic polymer (manufactured by Toyo Styrene Co., Ltd., "GPPS G100C")

Polymer 6: Polystyrenic polymer (manufactured by Aldrich, Mich. 12 g/10 minutes)

(B) Coloring Agent

Coloring agent 1: Blue organic pigment (Blue 15:3 (copper phthalocyanine blue))

Coloring agent 2: Red organic pigment (Red No. 202 (Pigment Red 57:1))

Coloring agent 3: Green water-soluble coloring agent (aqueous food coloring matter (green), containing Food Yellow No. 4, Food Blue No. 1 and dextrin, manufactured by Kyoritsu Foods Co., Ltd.)

Coloring agent 4: Red dye for polymer (manufactured by Orient Chemical Industries, Ltd., "OPLAS RED330")

Coloring agent 5: Black dye for polymer (manufactured by Orient Chemical Industries, Ltd., "NUBIAN BLACK PC-0850")

Coloring agent 6: Zinc oxide (manufactured by Sumitomo Osaka Cement Co., Ltd., "ZnO-350Si(4)G")

Coloring agent 7: Hydrophobized titanium dioxide (manufactured by Nippon Aerosil Co., Ltd., "TITANDIOXID T805")

(C) Water-Soluble Auxiliary Component (C1) Oligosaccharide: Starch sugar (manufactured by Towa Chemical Industry Co., Ltd., reduced saccharification product of a starch "PO-10", a viscosity of a 50% by weight aqueous solution measured at 25° C. by a B-type viscometer: 6.5 Pa·s)

(C2) Water-soluble plasticizing component: Sugar alcohol (manufactured by Towa Chemical Industry Co., Ltd., "Marinecrystal D(-)mannitol")

The results are shown in Tables 1 and 2.

[Table 1]

TABLE 1

|  | Examples | | | | | | Comparative Examples | | |
|---|---|---|---|---|---|---|---|---|---|
|  | 1 | 2 | 3 | 4 | 5 | 6 | 1 | 2 | 3 |
| Polymer | Polymer 1 | Polymer 2 | Polymer 1 | Polymer 2 | Polymer 3 | Polymer 4 | Polymer 1 | Polymer 2 | Polymer 3 |
| [parts] | 40 | 40 | 40 | 40 | 40 | 60 | 40 | 40 | 40 |
| Auxiliary component (C1) [parts] | 75 | 75 | 75 | 75 | 80 | 80 | 75 | 75 | 75 |
| Auxiliary component (C2) [parts] | 25 | 25 | 25 | 25 | 20 | 20 | 25 | 25 | 25 |
| Coloring agent [parts] | Coloring agent 1 | Coloring agent 2 | Coloring agent 1 | Coloring agent 2 | Coloring agent 2 | Coloring agent 2 | Coloring agent 3 | Coloring agent 3 | Coloring agent 3 |
|  | 0.4 | 0.4 | 0.4 | 0.4 | 0.4 | 0.4 | 4 | 4 | 4 |
| Number average particle size (µm) | 14 | 4.1 | 14 | 4.1 | 6.4 | 5.9 | 14 | 4.1 | 6.4 |
| Coefficient of variation of particle size (%) | 49 | 17 | 51 | 16 | 32 | 37 | 49 | 16 | 33 |
| Shape | Finely spherical shape | Finely spherical shape | Finely spherical shape | Finely spherical shape | Finely spherical shape | Finely spherical shape | Finely spherical shape | Finely spherical shape | Finely spherical shape |
| Color of fine particle | Blue | Red | Blue | Red | Red | Red | Colorless | Light brown | Colorless |

TABLE 1-continued

|  | Examples | | | | | | Comparative Examples | | |
| --- | --- | --- | --- | --- | --- | --- | --- | --- | --- |
|  | 1 | 2 | 3 | 4 | 5 | 6 | 1 | 2 | 3 |
| Color of aqueous solution of extracted auxiliary component | Colorless | Colorless | Colorless | Colorless | Colorless | Colorless | Green | Green | Green |

(In Table, "parts" means "parts by weight")

[Table 2]

TABLE 2

|  | Examples | | | | |
| --- | --- | --- | --- | --- | --- |
|  | 7 | 8 | 9 | 10 | 11 |
| Polymer [parts] | Polymer 5 25 | Polymer 5 27 | Polymer 2 25 | Polymer 2 21 | Polymer 6 27 |
| Auxiliary component (C1) [parts] | 75 | 75 | 75 | 75 | 75 |
| Auxiliary component (C2) [parts] | 25 | 25 | 25 | 25 | 25 |
| Coloring agent [parts] | Coloring agent 4 5 | Coloring agent 7 3 | Coloring agent 5 5 | Coloring agent 6 9 | Coloring agent 7 3 |
| Number average particle size (μm) | 2.2 | 5.5 | 3.5 | 10.2 | 2.8 |
| Coefficient of variation of particle size (%) | 15 | 30 | 13 | 28 | 22 |
| Shape | Finely spherical shape | Finely spherical shape | Finely spherical shape | Finely spherical shape | Finely spherical shape |
| Color of fine particle | Red | White | Black | White | White |
| Color of aqueous solution of extracted auxiliary component | Colorless | Colorless | Colorless | Colorless | Colorless |

(In Table, "parts" means "parts by weight")

In each of Examples, the colored polymer particle has a hue derived from the used coloring agent, and no coloring was observed in the aqueous solution of the extracted auxiliary component. Moreover, the shape of the particle was finely spherical in each of Examples, and the particles having a small coefficient of variation in the particle size and a uniform particle size were obtained.

On the other hand, in Comparative Examples 1 to 3 using a water-soluble coloring matter as the coloring agent, the obtained polymer fine particle was not colored at all, and conversely, to the aqueous solution of the extracted auxiliary component was imparted a color of the coloring matter.

The invention claimed is:

1. A process for producing a particle, which comprises a first step of forming a compositional structure by melt-kneading an organic solid polymer component (A), a coloring agent (B) and a water soluble auxiliary component (C) comprising at least an oligosaccharide (C1),
wherein this melt-kneading step forms the compositional structure having:
   i) a matrix (continuous phase) comprising the water-soluble auxiliary component (C), and
   ii) a particulate dispersed phase comprising the organic solid polymer component (A) and the coloring agent (B), and being dispersed in the matrix (continuous phase),
wherein the process further comprises a second step of eluting the water soluble auxiliary component (C) from the composition to produce a particle comprising the organic solid polymer component (A) and the coloring agent (B).

2. A process according to claim 1, wherein the coloring agent (B) comprises at least one member selected from the group consisting of an oil-soluble dye and an organic or an inorganic pigment.

3. A process according to claim 1, wherein the average particle size of the dispersed phase is 0.1 to 100 μm, and the average particle size of the coloring agent (B) is not more than 50% of the average particle size of the dispersed phase.

4. A process according to claim 1, wherein the particle is spherical and has an average particle size of 0.1 to 100 μm, a coefficient of variation of the average particle size of not more than 60, and a length ratio of a major axis relative to a minor axis of 1.5/1 to 1/1.

5. A process according to claim 1, wherein the proportion of the coloring agent (B) is 0.001 to 100 parts by weight relative to 100 parts by weight of the organic solid component (A).

6. A process according to claim 1, wherein the oligosaceharide (C1) comprises at least a tetrasaccharide.

7. A process according to claim 1, wherein the oligosaccharide (C1) comprises at least one member selected from the group consisting of a starch sugar, a galactooligosaceharide, a coupling sugar, a fructooligosaceharide, a xylooligosaccharide, a soybean oligosaceharide, a chitin oligosaccharide and a chitosan oligosaceharide.

8. A process according to claim 1, wherein the oligosaccharide (C1) has a viscosity of not lower than 1 Pa·s when a 50% by weight aqueous solution of the oligosaccharide is measured at a temperature of 25° C. by a B-type viscometer.

9. A process according to claim 1, wherein the auxiliary component (C) comprises the oligosaccharide (C1) and a water-soluble plasticizing component (C2) for plasticizing the oligosaccharide (C1).

10. A process according to claim 9, wherein the oligosaccharide (C1) shows a melting point or softening point or is decomposed at a temperature higher than a heat distortion temperature of the organic solid component (A), and the melting point or softening point of the plasticizing component (C2) is not higher than the heat distortion temperature of the organic solid component (A).

11. A process according to claim 9, wherein the plasticizing component (C2) comprises at least one member selected from the group consisting of a saccharide and a sugar alcohol.

12. A process according to claim 11, wherein the sugar alcohol comprises at least one member selected from the group of erythritol, pentaerythritol, arabitol, ribitol, xylitol, sorbitol, dulcitol and mannitol.

13. A process according to claim 9, wherein the ratio (weight ratio) of the oligosaccharide (C1) relative to the plasticizing component (C2) is 99/1 to 50/50.

14. A process according to claim 1, wherein the ratio (weight ratio) of the organic solid component (A) relative to the auxiliary component (C) is 55/45 to 1/99.

15. A process according to claim 1, wherein the melt-kneading is performed on an organic solid polymer component (A) comprising a water-insoluble polymer.

* * * * *